United States Patent
Miller et al.

(10) Patent No.: US 10,632,577 B2
(45) Date of Patent: Apr. 28, 2020

(54) TURBOMACHINE SERVICE APPARATUS AND RELATED METHOD

(71) Applicant: General Electric Company, Schenectady, NY (US)

(72) Inventors: Maxwell Evan Miller, Simpsonville, SC (US); Robert Edward Huth, Greenville, SC (US); Zachary Lane Walters, Woodruff, SC (US)

(73) Assignee: General Electric Company, Schenectady, NY (US)

( * ) Notice: Subject to any disclaimer, the term of this patent is extended or adjusted under 35 U.S.C. 154(b) by 224 days.

(21) Appl. No.: 15/597,581

(22) Filed: May 17, 2017

(65) Prior Publication Data

US 2018/0333812 A1  Nov. 22, 2018

(51) Int. Cl.
| | |
|---|---|
| *F01D 25/26* | (2006.01) |
| *F01D 25/24* | (2006.01) |
| *B23P 19/06* | (2006.01) |
| *B25B 29/02* | (2006.01) |
| *F16B 31/04* | (2006.01) |

(52) U.S. Cl.
CPC ............ *B23P 19/067* (2013.01); *B25B 29/02* (2013.01); *F01D 25/243* (2013.01); *F16B 31/043* (2013.01); *F05D 2230/60* (2013.01); *F05D 2230/70* (2013.01); *F05D 2230/72* (2013.01)

(58) Field of Classification Search
CPC ...... B23P 19/067; F01D 25/243; B25B 29/02; F16B 31/043; F05D 2230/72; F05D 2230/70; F05D 2230/60
See application file for complete search history.

(56) References Cited

U.S. PATENT DOCUMENTS

| | | | |
|---|---|---|---|
| 1,607,929 | A | 11/1926 | Waters |
| 2,600,214 | A | 6/1952 | Davis |

(Continued)

FOREIGN PATENT DOCUMENTS

| | | | |
|---|---|---|---|
| DE | 3704202 C1 | 5/1988 | |
| WO | 9533598 A1 | 12/1995 | |
| WO | WO-9533598 A1 * | 12/1995 | ............ B23P 19/067 |

OTHER PUBLICATIONS

Extended European Search Report and Opinion issued in connection with corresponding EP Application No. 18171493.2, dated Oct. 1, 2018.

*Primary Examiner* — Lawrence Averick

(74) *Attorney, Agent, or Firm* — James Pemrick; Hoffman Warnick LLC

(57) ABSTRACT

Various embodiments include an apparatus for servicing a turbomachine, along with a related servicing method. In some cases, the apparatus includes: a system for servicing a turbomachine casing having adjacent segments joined with a set of threaded fasteners, the system including: a threaded fastener tensioning device sized to fit over ends of a threaded fastener in the set of threaded fasteners, the threaded fastener tensioning device including: a retention component for retaining a first end of the threaded fastener; and a tensioner for tensioning or de-tensioning a second end of the threaded fastener; and a mounting system coupled with the threaded fastener tensioning device, the mounting system for retaining the threaded fastener tensioning device proximate the adjacent segments of the turbomachine casing.

5 Claims, 5 Drawing Sheets

(56) References Cited

U.S. PATENT DOCUMENTS

| | | | |
|---|---|---|---|
| 4,824,087 A | | 4/1989 | Hannel |
| 4,884,934 A | * | 12/1989 | Ikeda .................... B23P 19/068 411/383 |
| 5,463,812 A | | 11/1995 | Aschenbruck et al. |
| 5,892,344 A | | 4/1999 | Cooley |
| 8,424,857 B2 | | 4/2013 | Green et al. |
| 8,465,254 B2 | * | 6/2013 | Swart .................... F01D 25/243 415/214.1 |
| 9,212,651 B2 | | 12/2015 | Johst et al. |
| 9,242,354 B2 | * | 1/2016 | Walsh .................... B25B 21/00 |
| 2011/0243727 A1 | * | 10/2011 | Swart .................... F01D 25/243 415/214.1 |
| 2013/0000245 A1 | | 1/2013 | Tarr |
| 2013/0091992 A1 | * | 4/2013 | Walsh .................... B25B 21/00 81/55 |
| 2014/0305223 A1 | | 10/2014 | Twerdochlib et al. |

* cited by examiner

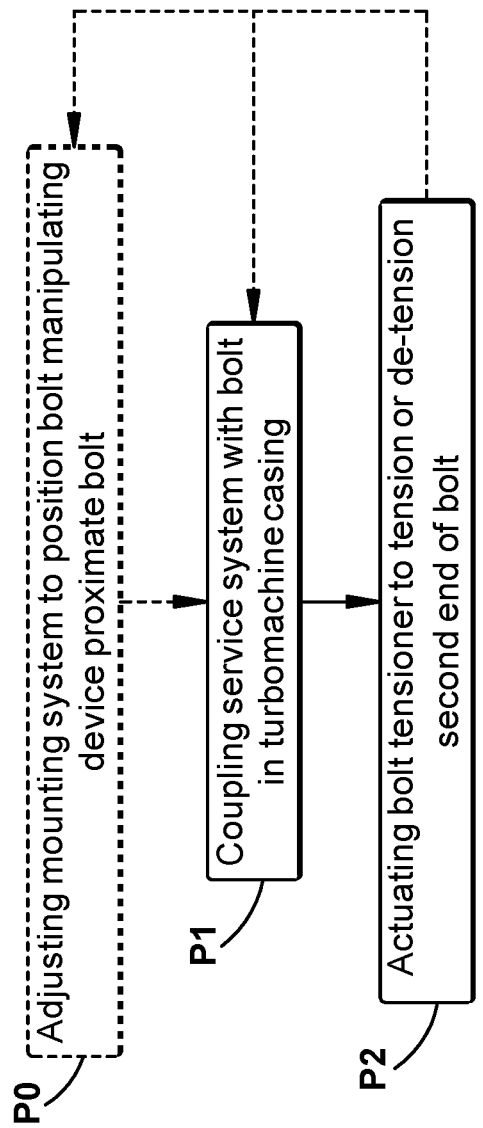

TURBOMACHINE SERVICE APPARATUS AND RELATED METHOD

FIELD OF THE INVENTION

The subject matter disclosed herein relates to turbomachines. More particularly, the subject matter disclosed herein relates to service apparatuses and methods for servicing turbomachines, e.g., gas turbomachines.

BACKGROUND OF THE INVENTION

Gas turbomachines (also referred to as gas turbines) include internal sections or chambers, including a compression chamber, a combustion chamber and a turbine section, surrounded by a casing (or shell). The casing is conventionally composed of segments which are bolted together at one or more interfaces. During servicing (e.g., installation, repair, maintenance), the weight of these individual segments, as well as the overall weight of the turbomachine, can place significant tension on the bolts (or, threaded fasteners) which hold the casing together. Conventional approaches for servicing turbomachines, in particular, in coupling/decoupling casing joints, involve a large crew of human operators (e.g., up to five people) performing an extensive process (e.g., including a dozen or more sub-processes). These conventional approaches are time-consuming and costly, both in terms of service equipment and labor costs, as well as machine downtime.

BRIEF DESCRIPTION OF THE INVENTION

Various embodiments of the disclosure include an apparatus for servicing a turbomachine, along with a related servicing method. In a first aspect, an apparatus includes: a system for servicing a turbomachine casing having adjacent segments joined with a set of threaded fasteners, the system including: a threaded fastener tensioning device sized to fit over ends of a threaded fastener in the set of threaded fasteners, the threaded fastener tensioning device including: a retention component for retaining a first end of the threaded fastener; and a tensioner for tensioning or de-tensioning a second end of the threaded fastener; and a mounting system coupled with the threaded fastener tensioning device, the mounting system for retaining the threaded fastener tensioning device proximate the adjacent segments of the turbomachine casing.

A second aspect of the disclosure includes a method of servicing a turbomachine casing having adjacent segments joined with a set of threaded fasteners, the method including: coupling a service system with a threaded fastener in the set of threaded fasteners, the service system having: a threaded fastener tensioning device sized to fit over ends of the threaded fastener, the threaded fastener tensioning device including: a retention component for retaining a first end of the threaded fastener; and a tensioner for tensioning or de-tensioning a second end of the threaded fastener; and a mounting system coupled with the threaded fastener tensioning device, the mounting system for retaining the threaded fastener tensioning device proximate the adjacent segments of the turbomachine casing; and actuating the threaded fastener tensioner to tension or de-tension the second end of the threaded fastener.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 5 shows a flow diagram illustrating a process according to various embodiments of the disclosure.

Figure 1:
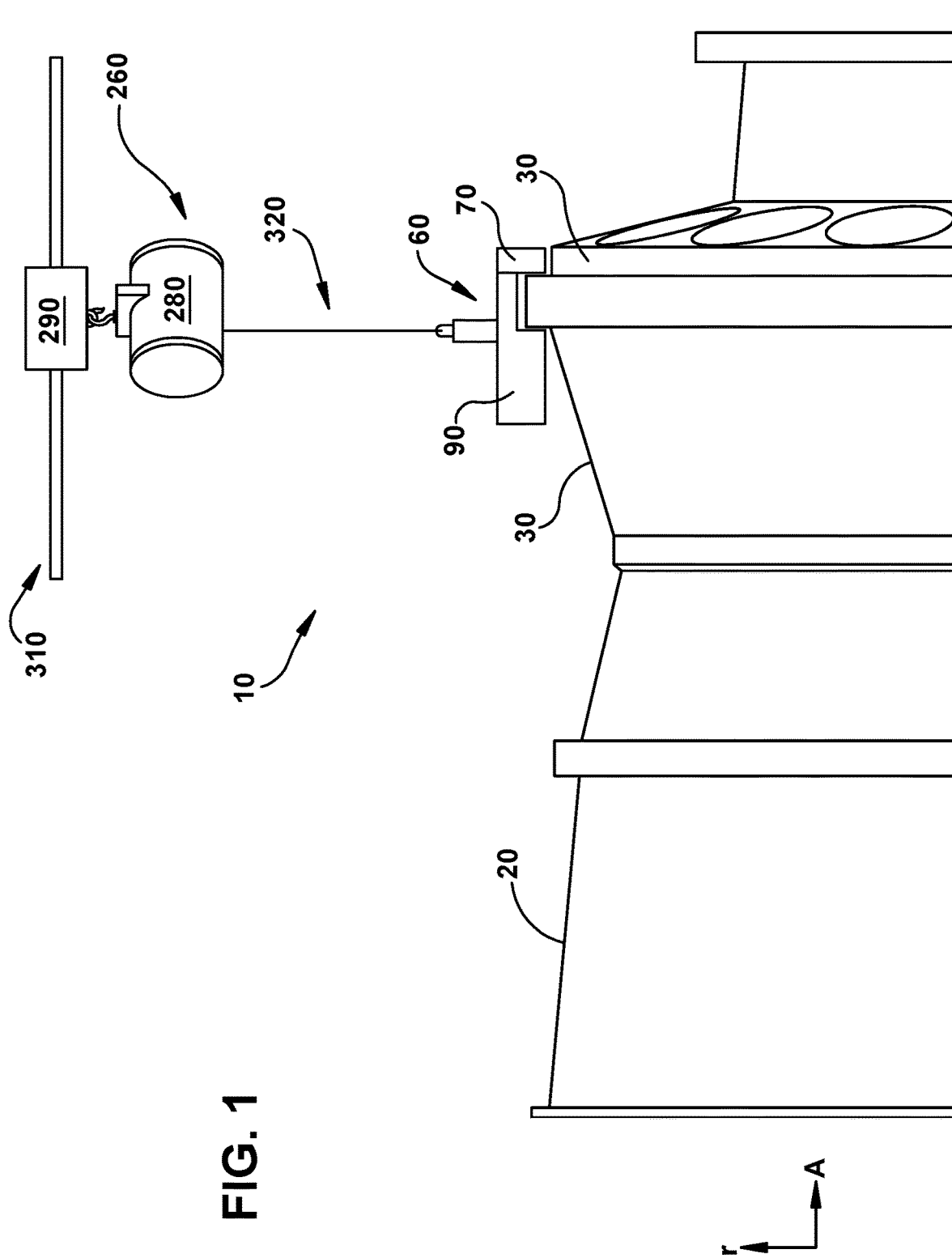
FIG. 1 shows a schematic depiction of a system for servicing a turbomachine casing according to various embodiments of the disclosure.

It is noted that the drawings of the various aspects of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated herein, the subject matter disclosed relates to gas turbomachines. More particularly, the subject matter disclosed herein relates to service apparatuses and methods for servicing gas turbomachine casings.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

Conventional gas turbomachines use a threaded fastener mechanism to couple their casings together at vertical and horizontal joints. The threaded fastener mechanism includes a threaded stud with a flat nut on each end used to fasten the casing sections together. The threaded fastener mechanism is placed into tension, rather than torqued, to achieve the desired applied load for coupling the casing sections (e.g., approximately 60 kilo-pounds/square inch, or approximately 415 Mega-Pascals).

According to various embodiments of the disclosure, a system is configured for servicing a gas turbomachine (GT) casing. The system can include a threaded fastener tensioning device for tensioning/de-tensioning the threaded fasteners on the GT casing, and a mounting system for affixing the threaded fastener tensioning device in position relative to the GT casing. The threaded fasteners (including a threaded stud and complementary nut) can be pre-loaded (or threaded) to couple adjacent sections of the GT casing. The threaded fastener tensioning device can include a retention component and a tensioning/de-tensioning device for placing tension on, or removing tension from, the nuts on the end of the threaded studs after the threaded fasteners are loaded to initially couple the adjacent sections of the GT casing. The threaded fastener tensioning device can include a set of actuatable handles for use by an operator (e.g., a human operator) to tension/de-tension the nuts and ease the process of coupling/decoupling sections of the GT casing. In some cases, the mounting system can include an overhead lift or gantry system, and in some particular cases, the mounting system can include a pneumatic lifting device.

Figure 2:
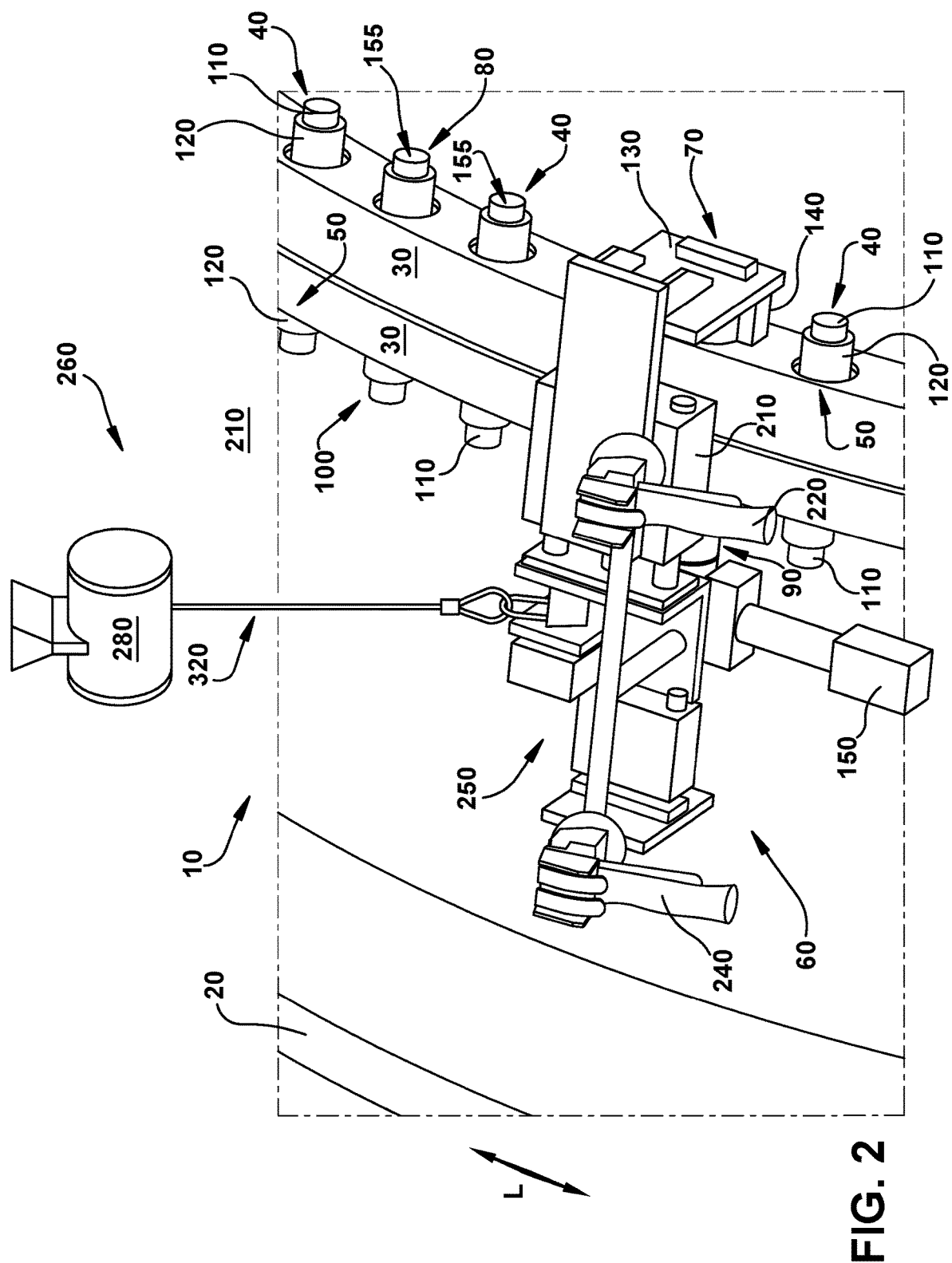
FIG. 2 shows a close-up perspective view of a service system interacting with a turbomachine casing according to various embodiments of the disclosure.
Figure 3:
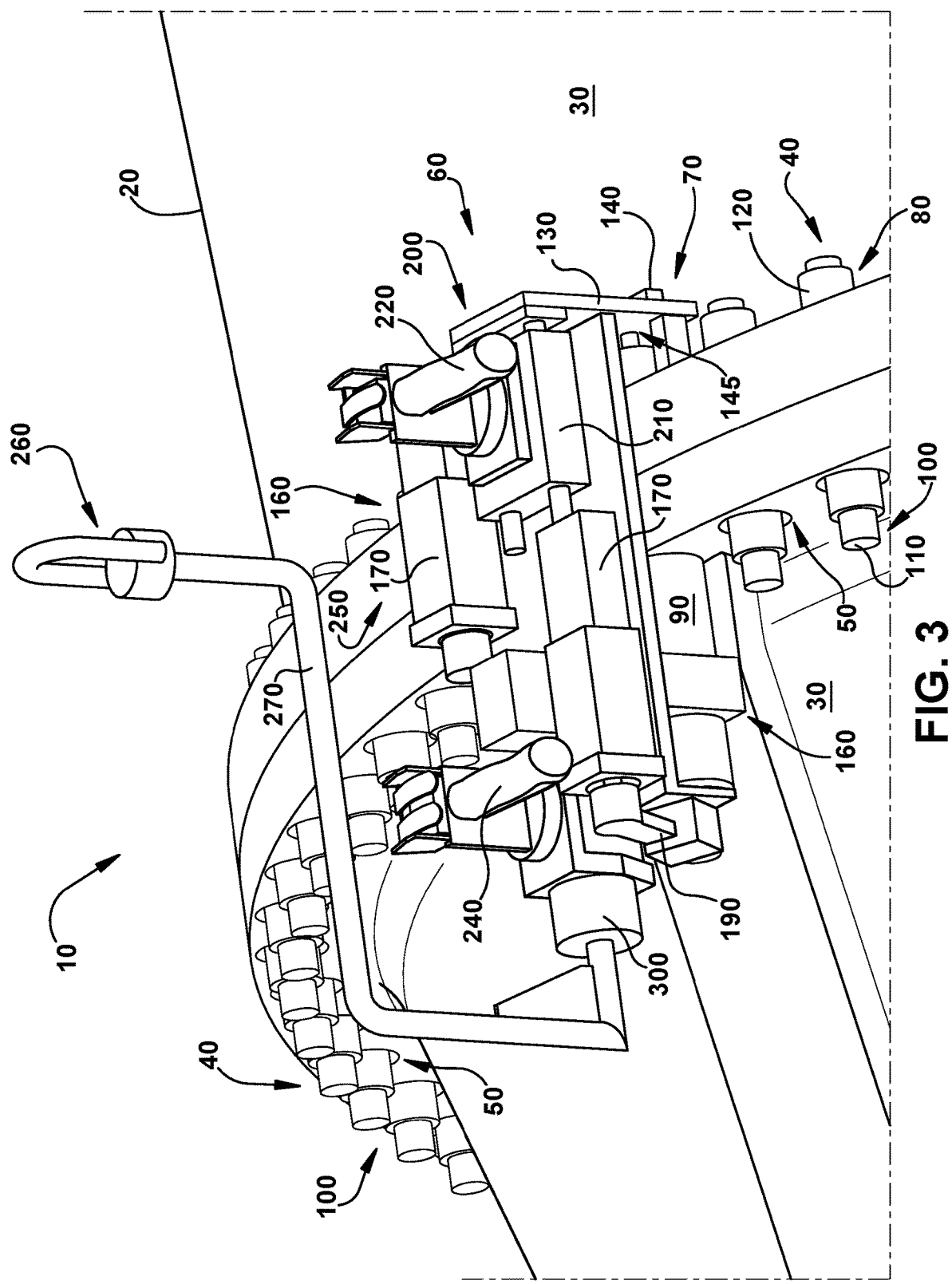
FIG. 3 shows an additional close-up perspective view of the system of FIG. 2 according to various embodiments of the disclosure.
Figure 4:
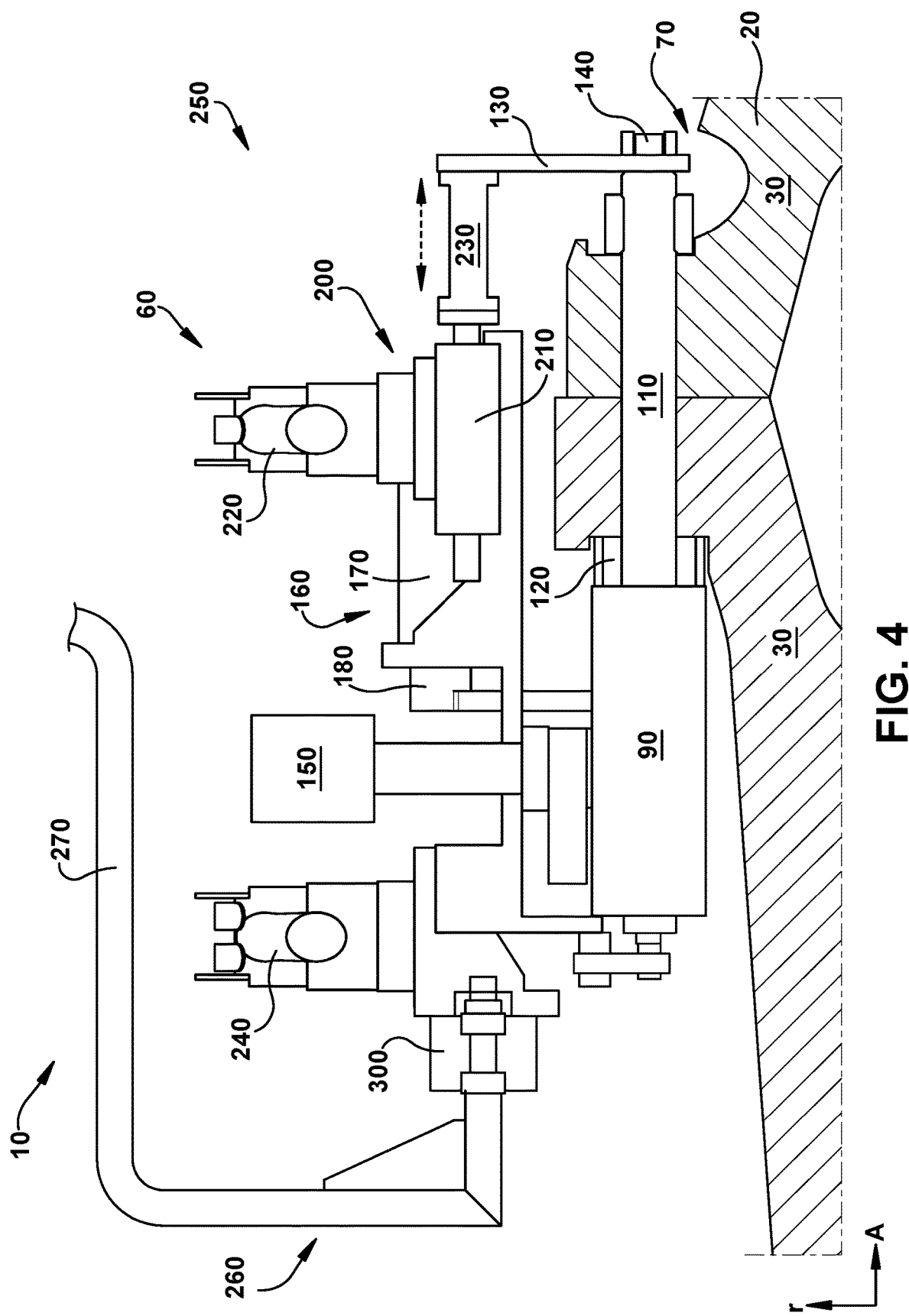
FIG. 4 shows a schematic cross-sectional view of a portion of the service system and turbomachine casing of FIG. 3.

FIG. 1 shows a schematic depiction of a system 10 for servicing a turbomachine casing 20 according to various embodiments of the disclosure. FIGS. 2 and 3 show close-up perspective views of the system 10 interacting with turbomachine casing 20 according to various embodiments of the disclosure. FIG. 4 shows a schematic cross-sectional view of a portion of system 10 and turbomachine casing 20. FIGS. 1-4 are referred to simultaneously to illustrate various particular aspects of the disclosure.

As shown with particular clarity in FIGS. 1-3, turbomachine casing 20 can include adjacent segments 30 (two shown) joined with a set of threaded fasteners (e.g., nut/bolt combinations) 40. In various embodiments, turbomachine casing 20 can include a gas turbomachine casing, which may be joined at a horizontal or vertical joint between adjacent segments 30. Segments 30 can be joined according to conventional approaches, e.g., by aligning segments 30, including threaded fastener openings 50, and inserting threaded fasteners 40 in threaded fastener openings 50. As noted herein, threaded fasteners 40 can be pre-loaded, or threaded, to couple segments 30 together, prior to performing processes according to various embodiments described herein. According to various embodiments, system 10 can include a threaded fastener tensioning device 60 sized to fit over a threaded fastener 40 (in the set of threaded fasteners 40) after that fastener has been placed in openings 50 and initially loaded (or threaded). Threaded fastener tensioning device 60, as described herein, can include a variety of sub-components for tensioning/de-tensioning one or more threaded fasteners 40 in the set of threaded fasteners 40. Threaded fastener tensioning device 60 is sized (or, configured) to fit over ends of threaded fastener 40 (along its primary axis) in order to tension/de-tension that threaded fastener 40 as described herein.

In various embodiments, threaded fastener tensioning device 60 can include a retention component 70 for retaining a first end 80 of threaded fastener 40, and a tensioner 90 for tensioning or de-tensioning a second end 100 of threaded fastener 40. Each threaded fastener 40 can include a threaded stud 110 (e.g., externally threaded stud) and a nut 120 (e.g., internally threaded nut) threadably coupled on each end 80, 100 of threaded stud 110, for holding threaded fastener 40 in place between segments 30. Retention component 70 is sized to restrict rotation of threaded stud 110 at first end 80 of threaded fastener 40. In various embodiments, retention component 70 can include an adapter plate 130 and a coupler 140 for retaining first end 80 of threaded fastener 40. In some particular embodiments. In some cases, coupler 140 can include an interface configured to mate with first end 80 of threaded fastener 40, e.g., where first end 80 has an outer surface with a contour, edge, etc., coupler 140 can include a sleeve or slot with a complementary interface for mating with first end 80. In some cases, first end 80 of threaded fastener 40 (e.g., nut 120) has a multi-faced outer surface, such as a square or hexagonal threaded fastener-headed surface, and coupler 140 includes a complementary inner surface for retaining first end 80. In other cases, coupler 140 can be configured to expand/contract to interface with first end 80 of threaded fastener 40, e.g., at nut 120). In various embodiments, adapter plate 130 can be configured to lock coupler 140 in place to retain threaded fastener 40. Nut 120 at first end 80 can be place over threaded fastener 40 and adjusted according to various conventional approaches. In various embodiments, nut 120 (having internal threads) is threaded over threaded stud 110 (having external threads) and rotated to adjust the threaded fastener 40. In other embodiments, coupler 140 can include a prong 145 (or other protrusion) (FIG. 3) sized to mate with a slot 155 in first end 80 of stud 110 (FIG. 2). In some cases, slot 155 can include a hexagonal-shaped or square-shaped internal slot having a plurality of faces. In these cases, prong 145 can include a complementary number of external faces, such that prong 145 and slot 155 can mate in a male-female manner It is understood that in various embodiments, coupler 140 can be configured with an internal slot for receiving a prong extending from first end 80 of stud 110. That is, other conventional male-female mating configurations could be used by coupler 140 to retain threaded fastener 40.

Tensioner 90 can be configured to couple with second (opposite) end 100 of threaded fastener 40 (e.g., in particular threaded stud 110 and nut 120), and can include a conventional tensioning device for imparting or releasing tension on threaded fasteners (e.g., threaded fastener 40). Tensioner 90 can include a conventional hydraulic threaded fastener tensioning cylinder, such as those available from ITH Threaded fastenering Technology, of Munich, Germany However, other conventional tensioning devices and/or tensioning cylinders can be utilized according to various aspects of the disclosure. Tensioner 90 can include an integrated hydraulic system, or can be coupled with a hydraulic system 150 on threaded fastener tensioning device 60 or an external hydraulic system, as is known in the art. The tensioning/de-tensioning process can include mounting tensioner 90 onto nut 120 at second end 100 of threaded fastener 40. The tensioner 90 can include a hydraulic threaded fastener tensioning cylinder, which can be threaded onto threaded fastener 40 at second end 100 according to various embodiments. After mounting tensioner 90, hydraulic pressure can be applied through the tensioner 90, e.g., via actuation of a handle, as described herein. The hydraulic pressure applies (or releases) tension to/from threaded fastener 40, and nut 120 on second end 100 can be tightened or loosened using a wrenching system 160 (FIGS. 3 and 4). In some cases, wrenching system 160 can include one or more motors 170 coupled with an actuator 180 (FIG. 4) for initiating tightening/loosening of nut 120 on threaded stud 110. In some cases, wrenching system 160 includes a set of gears for initiating actuator 180 to tighten/loosen nut 120. In various embodiments, wrenching system 160 can be actuated using a lever 190 (FIG. 3) coupled with motor 170. As noted herein, coupler 140 can be configured to retain stud 110 at first end 80 during the tensioning process.

In various embodiments, as shown in FIGS. 3 and 4, threaded fastener tensioning device 60 can further include an adapter 200 connected with retention component 70 and tensioner 90 for modifying a position of retention component 70 relative to tensioner 90 in order engage or disengage threaded fastener 40. In various embodiments, adapter 200 can include an actuatable cylinder 210 connected with retention component 70, and a handle 220 coupled with actuatable cylinder 210 for modifying a position of retention component 70 relative to tensioner 90, e.g., axially toward or away from tensioner 90. In some cases, actuatable cylinder 210 can include a pneumatic or hydraulic cylinder connected with adapter plate 130, e.g., via an extension member 230 (example embodiment illustrated in FIG. 4). Handle 220 can be actuatable by an operator (e.g., human and/or robotic user) to initiate flow of pneumatic or hydraulic fluid in actuatable cylinder 210, and move adapter 200 (e.g., extension member 230 and/or adapter plate 130).

In various embodiments, threaded fastener tensioning device 60 can also include a second handle 240 coupled with tensioner 90 for initiating tensioning or de-tensioning of second end 100 of threaded fastener 40. That is, according to various embodiments, tensioner 90 can include handle 240 which allows an operator (e.g., human and/or robotic user) to actuate tensioner 90 and tension/de-tension threaded fastener 40. In some cases, second handle 240 and (first) handle 220 are accessible from a same side (or, top side) 250 of threaded fastener tensioning device 60 to allow the operator to effectively control both tensioner 90 and adapter 200 during a service operation. In various embodiments, handle 240 and/or handle 220 can take the form of any actuatable arm, lever, or other member which can be rotated, flipped, or otherwise manipulated to perform functions described herein.

In some cases, system 10 can further include a mounting system 260 coupled with threaded fastener tensioning device 60. Mounting system 260 can be configured to retain threaded fastener tensioning device 60 proximate segments 30 of casing 20. In some cases, as shown in FIGS. 3 and 4, mounting system 260 can include a mounting arm 270 coupled with threaded fastener tensioning device 60 for coupling with an external mounting structure, e.g., a crane system, gantry system, robotic arm, or lift. In some cases, mounting arm 270 can be coupled with an overhead crane 280 and/or gantry system 290 (FIGS. 1 and 2) for modifying a position of threaded fastener tensioning device 60 relative to casing 20. In various embodiments, an overhead crane 280 can include a pneumatic or hydraulic lifting system for moving threaded fastener tensioning device 260 according to various control commands In some cases, overhead crane 280 can be mounted or otherwise coupled with gantry system 290, which may be mounted to a ceiling or overhead surface 310 (only a portion shown in FIG. 1). In some particular embodiments, overhead crane 280 can include a line 320 for coupling with threaded fastener tensioning device 60 (e.g., a retractable/extendable line 320) to enable movement of threaded fastener tensioning device in the radial direction. However, it is understood that mounting system 260 can include any additional conventional mounting system(s), including a direct mounting system (e.g., connecting directly to casing 20), and/or a floor-based mounting system (e.g., supported in some manner by a common surface which supports casing 20). In some cases, overhead crane 280 and/or gantry system 290 can be controlled by a control system and/or a human or robotic operator, to modify the position of threaded fastener tensioning device 60 relative to casing 20, e.g., moving threaded fastener tensioning device 60 axially (direction A), laterally (direction L) and/or radially (direction r) to adjust one or more threaded fasteners 40 on casing 20 (FIGS. 1-4). In some cases, as shown in FIGS. 3 and 4, mounting system 260 can further include a rotatable retention component 300 between mounting arm 270 and threaded fastener tensioning device 60 for permitting movement of mounting arm 270 relative to threaded fastener tensioning device 60. This rotatable retention component 300 can allow the threaded fastener tensioning device 60 to adjust a plurality of threaded fasteners 40 along the arced interface of casing 20 without requiring movement (e.g., rotation) of casing 20. In various embodiments, rotatable retention component 300 can include a locking mechanism for locking threaded fastener tensioning device 60 along a range of angles relative to mounting arm 270 (which remains substantially vertically aligned).

In various embodiments, a method of servicing turbomachine casing 20 can be performed according to processes outlined in the flow diagram of FIG. 5. These processes are described with continuing reference to FIGS. 1-4. As shown, these processes can include:

Process P0 (optional pre-process in various embodiments): Adjusting mounting system 260 to position threaded fastener tensioning device 60 proximate threaded fastener 40. In some cases, this can include instructing mounting system 260 to move axially (direction A), laterally (direction L) and/or radially (direction r) in order to position threaded fastener tensioning device 60 proximate a threaded fastener 40 to be serviced. In some cases, an operator can manually control mounting system 260, e.g., via a controller for overhead crane 280 and/or gantry 290. In other case, overhead crane 280 and/or gantry 290 can include a conventional control system with programmable software for programming instructions to modify a position of a device coupled to the mounting system 260 (e.g., threaded fastener tensioning device 60). The programmable software may be configured to instruct overhead crane 280 and/or gantry 290 to move according to a prescribed pattern or set of inputs to position/reposition threaded fastener tensioning device 60 relative to casing 20. Other control scenarios known in the art could also be employed to position/reposition threaded fastener tensioning device 60 relative to casing 20.

Process P1: coupling service system 10 with a threaded fastener 40 in the set of threaded fasteners 40. As described herein, coupling service system 10 with threaded fastener can include adjusting a position of threaded fastener tensioning device 60, e.g., by adjusting a position of retention component 70 relative to tensioner 90 in order to fit the threaded fastener tensioning device 60 over the sections 30 of casing 20. That is, in various embodiments, an operator can actuate handle 220 in order to move adapter 200 (e.g., extension member 230 and/or adapter plate 130) such that the space between tensioner 90 and retention component 70 is greater than the length of threaded stud 110. At this spacing, threaded fastener tensioning device 60 can fit over sections 30 of casing 20 to engage threaded fastener 40. In some particular cases, operator can actuate handle 220 to move retention component 70, in order to engage first end 80 of stud 110 (with coupler 140). In various example embodiments, the coupling process can also include actuating lever 190 to engage motor 170 and thread tensioner 90 onto threaded fastener 40, and initiating actuator 180 to rotate the gear drive on tensioner 90. This process can align tensioner 90 with nut 120 in preparation for tensioning/de-tensioning threaded fastener 40. In some cases, Process P1 and Process P0 could be performed substantially simultaneously, or portions of these processes could overlap in time (e.g., adapter 200 could be actuated prior to, or simultaneously with process P0).

Process P2 (after Process P1): actuating threaded fastener tensioner 90 to tension or de-tension second end 100 of threaded fastener 40. In some cases, an operator can actuate second handle 240 to initiate tensioner 90 in order to tension/de-tension threaded fastener 40. As noted herein, in some cases, second handle 240 and (first) handle 220 are accessible from a same side (or, top side) 250 of threaded fastener tensioning device 60 to allow the operator to effectively control both tensioner 90 and adapter 200 during a service operation. In some particular cases, actuating second handle 240 can initiate pressurization of threaded fastener 40 (e.g., up to approximately 20 Mega-pascal (MPa), or approximately 20,000 pounds-per-square inch (psi)). In various embodiments, following pressurization, actuator 180 is configured to thread or un-thread stud 110 and disengage nut 120, thereby imparting or releasing tension from threaded fastener 40. Tensioner 90 can then release pressure, and lever 190 can be actuated to unthread tensioner 90 from threaded fastener 90. In some particular cases, an operator can actuate second handle 240 during the entirety of the tensioning/de-tensioning process, until appropriate tension is applied to, or released from, threaded fastener 40.

It is understood that processes P0-P2 can be performed for a plurality of threaded fasteners 40 in a casing 20. In various embodiments, additional processes can include de-coupling service system 10 from threaded fastener 40 (e.g., reversing processes P2 and P1) and coupling service system 10 to a distinct threaded fastener 40 in the set of threaded fasteners 40 (e.g., performing processes P1 and P2, and optionally process P0 for a second threaded fastener 40). For example, in various embodiments, the operator can actuate handle 220 coupled with actuatable cylinder 210 to modifying a position of retention component 70 relative to tensioner 90, thereby allowing for removal of service system 10 from threaded fastener 40. The processes noted here can be repeated for a plurality of threaded fasteners 40.

According to various embodiments, service system 10 can allow for significantly increased efficiency in servicing threaded fasteners 40 in a turbomachine casing 20 relative to conventional approaches. As noted herein, conventional approaches for servicing these threaded fasteners requires a large crew of operators (e.g., up to five people), and a many-step process (e.g., greater than a dozen steps). The service system 10 disclosed according to various embodiments can be utilized by 1-2 operators (e.g., two human operators, a human operator and a robotic operator, or a single human or robotic operator) to effectively service threaded fasteners 40 in a turbomachine casing 20. The handle and lever systems shown and described according to various embodiments can significantly increase the efficiency of service operations relative to conventional approaches, and can reduce system downtime.

In various embodiments, processes described herein can be iterated (repeated) periodically (e.g., according to schedule of x times per y period, and/or continuously) in order to aid in servicing one more portion(s) of turbomachine casing 20, e.g., in servicing a plurality of threaded fasteners 40 extending between various segments 30 of casing 20. In some cases, one or more of the processes described herein can be repeated, for example, for a set of components, e.g., threaded fasteners 40.

It is understood that in the processes described herein, other processes may be performed while not being explicitly described, and the order of processes can be rearranged according to various embodiments. Additionally, intermediate processes may be performed between one or more described processes. The flow of processes described herein is not to be construed as limiting of the various embodiments.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., soldering, fastening, ultrasonic welding, bonding). In various embodiments, electronic components described as being "coupled" can be linked via conventional hard-wired and/or wireless means such that these electronic components can communicate data with one another.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A system for servicing a turbomachine casing, the turbomachine casing having adjacent segments joined with a set of threaded fasteners along an arced interface of the casing, the system comprising:
    a threaded fastener tensioning device sized to fit over ends of a threaded fastener in the set of threaded fasteners, the threaded fastener including a threaded stud, a first nut threaded on a first end of the threaded stud, and a second nut threaded on a second end of the treaded stud, the threaded fastener tensioning device including:
        a retention component for retaining a first end of the threaded stud and for preventing rotation of the threaded stud during tensioning and de-tensioning of the threaded fastener; and
        a tensioner for tensioning or de-tensioning a second end of the threaded stud and for preventing rotation of the threaded stud during tensioning and de-tensioning of the treaded fastener; and
    a mounting system coupled with the threaded fastener tensioning device, the mounting system for retaining the threaded fastener tensioning device proximate the adjacent segments of the turbomachine casing and for modifying a positon of the threaded fastener tensioning device relative to the turbomachine casing;
    wherein the mounting system includes a mounting arm coupled with the threaded fastener tensioning device, a rotatable retention component coupling the mounting arm and the threaded fastener tensioning device, the rotatable retention component permitting movement of the threaded fastener tensioning device relative to the mounting arm along the arced interface of the casing, a locking mechanism for locking the threaded fastener tensioning device along a range of angles relative to mounting arm, and an external mounting structure coupled to the threaded fastener tensioning device by a cable, wherein the mounting arm remains vertically aligned during movement of the threaded fastener tensioning device relative to the mounting arm along the arced interface of the casing.

2. The system of claim 1, wherein the external mounting structure includes at least one of an overhead crane or a gantry system coupled with the mounting arm by the cable for modifying a positon of the threaded fastener tensioning device relative to the turbomachine casing.

3. The system of claim 1, wherein the threaded fastener tensioning device further includes an adapter connected with the retention component and the tensioner for modifying a position of the retention component relative to the tensioner to engage or disengage the threaded fastener.

4. The system of claim 3, wherein the adapter includes:
- an actuatable cylinder connected with the retention component; and
- a handle coupled with the actuatable cylinder for modifying a position of the retention component relative to the tensioner.

5. The system of claim 1, further comprising a handle coupled with the tensioner for initiating the tensioning or de-tensioning of the second end of the threaded fastener.

* * * * *